(12) United States Patent
Kam

(10) Patent No.: US 7,516,693 B2
(45) Date of Patent: Apr. 14, 2009

(54) FOLDING DEVICE FOR ROASTING POULTRY ON A BBQ GRILL

(75) Inventor: Ning Fan Kam, Tseung Kwan O (HK)

(73) Assignee: W.C. Bradley Company, Columbus, GA (US)

( * ) Notice: Subject to any disclaimer, the term of this patent is extended or adjusted under 35 U.S.C. 154(b) by 657 days.

(21) Appl. No.: 11/170,276

(22) Filed: Jun. 29, 2005

(65) Prior Publication Data
US 2007/0000395 A1  Jan. 4, 2007

(51) Int. Cl.
  *A47J 43/18* (2006.01)
  *A47F 5/14* (2006.01)
(52) U.S. Cl. ..................... 99/426; 211/181.1
(58) Field of Classification Search ........... 99/422–427, 99/429; 211/181.1
See application file for complete search history.

(56) References Cited

U.S. PATENT DOCUMENTS

| | | | |
|---|---|---|---|
| 1,339,625 A | 5/1920 | Holloway | |
| 1,349,302 A | 8/1920 | Spritz | |
| 2,821,904 A | 2/1958 | Arcabosso | 99/346 |
| 3,020,824 A | 2/1962 | Pantermoller | 99/346 |
| 3,053,169 A | 9/1962 | Rappaport | 99/421 |
| 3,280,907 A | 10/1966 | Hoffman | 165/185 |
| 3,392,665 A | 7/1968 | Harnest | 99/426 |
| 3,713,378 A | 1/1973 | West et al. | 99/346 |
| 4,027,583 A | 6/1977 | Spanek et al. | 99/421 |
| 4,450,759 A | 5/1984 | Steibel | 99/419 |
| 4,557,188 A | 12/1985 | Spanek | 99/415 |
| 4,558,197 A | 12/1985 | Wyatt | 219/10.55 |
| 4,633,773 A | 1/1987 | Jay | 211/181 |
| 4,709,626 A | 12/1987 | Hamlyn | 99/426 |
| 4,873,922 A | 10/1989 | Umholtz | 99/426 |
| 4,924,768 A | 5/1990 | Jay | 99/425 |
| 5,008,508 A | 4/1991 | Skerker et al. | 219/10.55 |
| 5,018,916 A | 5/1991 | Bauch et al. | 409/233 |
| 5,069,117 A | 12/1991 | Schlessel | 99/419 |
| 5,081,916 A | 1/1992 | Kuhling et al. | 99/419 |
| 5,106,642 A | 4/1992 | Ciofalo | 426/509 |
| 5,301,602 A | 4/1994 | Ryczek | 99/345 |
| 5,501,142 A | 3/1996 | Bailey | 99/482 |
| 5,538,050 A | 7/1996 | Galdon | 141/10 |
| 5,575,198 A | 11/1996 | Lowery | 99/426 |
| 5,662,028 A | 9/1997 | Fraga | 99/419 |
| 5,791,235 A | 8/1998 | Anselmo | 99/426 |
| 5,842,409 A | 12/1998 | Loffler et al. | 99/421 |
| 5,893,320 A | 4/1999 | Demaree | 99/419 |
| 6,119,585 A | 9/2000 | Guidry | 99/345 |
| 6,119,588 A * | 9/2000 | Tiemann | 99/426 |
| 6,125,739 A | 10/2000 | Jernigan | 99/345 |
| 6,192,792 B1 | 2/2001 | Gremillion | 99/426 |

(Continued)

*Primary Examiner*—Sang Y Paik
(74) *Attorney, Agent, or Firm*—Thomas, Kayden, Horstemeyer & Risley, LLP

(57) ABSTRACT

Provided is a folding apparatus for roasting poultry using a metallic liquid-storage container. The apparatus includes a base to provide lateral stability when placed on a cooking surface, hinge mounts attached to the base, hinges attached to the hinge mounts and vertical supports pivotally attached to the plurality of hinges. Also provided are methods for providing a folding device for roasting poultry using a metallic liquid-storage container. The methods include the steps of forming a base, attaching a hinge mount to the base, attaching a hinge to the hinge mount, and pivotally securing a vertical support to the hinge.

12 Claims, 7 Drawing Sheets

U.S. PATENT DOCUMENTS

| | | | |
|---|---|---|---|
| 6,467,399 B1 | 10/2002 | Boutte | 99/347 |
| 6,502,501 B1 | 1/2003 | Simon | 99/345 |
| 6,503,551 B1 * | 1/2003 | Hester | 426/523 |
| 6,553,896 B1 * | 4/2003 | Heide | 99/347 |

* cited by examiner

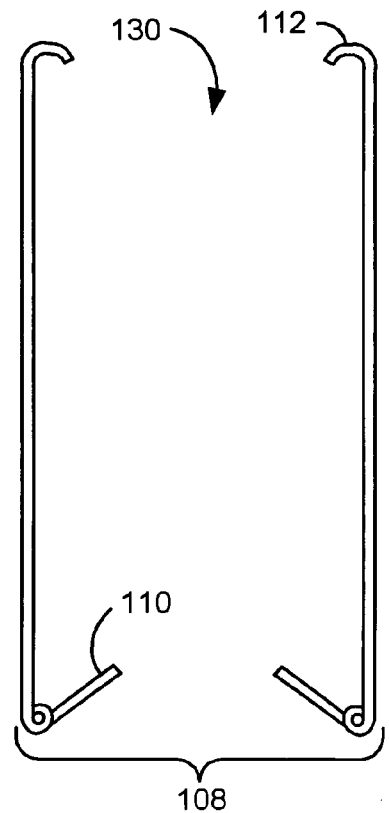 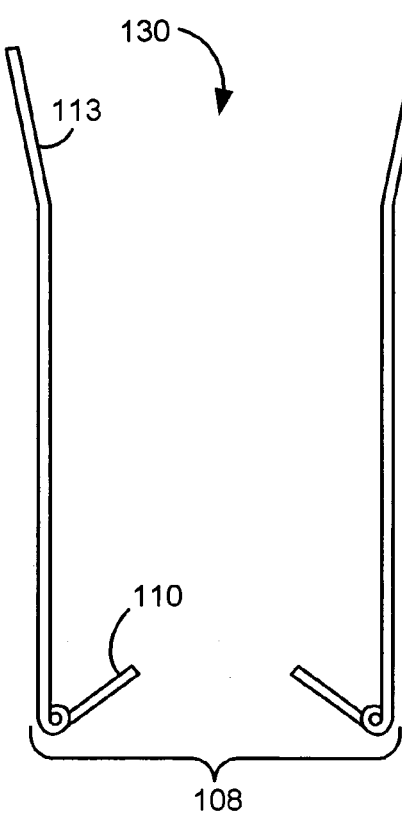 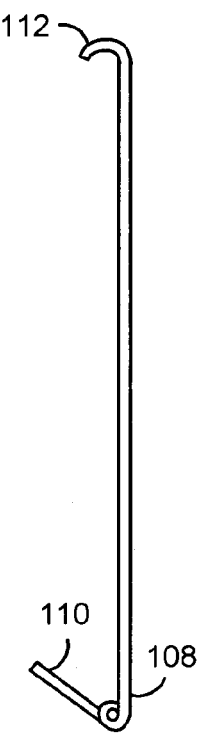
FIG. 6A  FIG. 6B  FIG. 6C
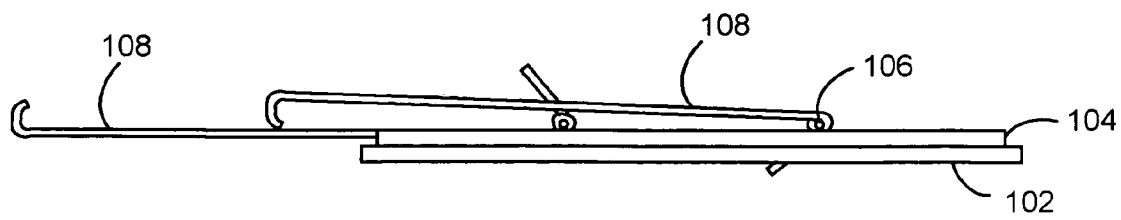
FIG. 7

FOLDING DEVICE FOR ROASTING POULTRY ON A BBQ GRILL

TECHNICAL FIELD

The present disclosure is generally related to BBQ grilling devices and, more particularly, is related to an apparatus and method for roasting poultry on a BBQ grill.

BACKGROUND

Outdoor cooking is commonly performed on barbecue grills, which use charcoal briquettes or propane or natural gas fueled burners for generating cooking heat. Many types of food selected for cooking on a grill are solid and are capable of being efficiently cooked in a consistent manner when placed directly on the cooking surface. These types of food include, for example, steaks, roasts, poultry pieces, frankfurters, and some types of vegetables. Cooking large hollow foods, such as whole poultry, however, is not performed as easily.

One device for overcoming the obstacles associated with cooking whole poultry on a cooking grill is a rotisserie, which rotates the poultry in a position suspended above the cooking surface. This method is time consuming because the cooking heat is only delivered to the food from the outside. Additionally, by the time the inside of the poultry is fully cooked, the meat closer to the outside may be undesirably dry due to overcooking.

Other devices for roasting poultry on an outdoor grill feature a vertical structure for inserting into the hollow cavity of the poultry and supporting the poultry in a generally vertical position on the cooking surface. An improvement on this type of device includes a structure for receiving a metallic liquid-storage container such as an aluminum can used to store soft drinks or beer. This improvement utilizes the liquid contents of the container to steam the poultry within the cavity during the cooking process. This steaming effect results in roasted poultry that is desirably moist. Additionally, the cooking time is reduced since the poultry is being cooked from the inside and the outside simultaneously. These devices, however, often either lack adequate structure to secure the container and/or consume significant space when not in use. Thus, a heretofore-unaddressed need exists in the industry to address the aforementioned deficiencies and inadequacies.

SUMMARY

Embodiments of the present disclosure provide an apparatus and method for roasting poultry on a BBQ grill. Briefly described, one embodiment, among others, can be implemented as a folding apparatus for roasting poultry using a metallic liquid-storage container. The apparatus includes: a base, formed of a heat resistant material in a substantially planar configuration to provide lateral stability when placed on a cooking surface; at least one hinge mount formed of a heat resistant material and attached to a first side of the base; a plurality of hinges formed of a heat resistant material and attached to the at least one hinge mount; and a plurality of vertical supports formed of a heat resistant material, each pivotally attached to one of the plurality of hinges.

Embodiments of the present disclosure can also be viewed as providing methods for a folding device for roasting poultry using a metallic liquid-storage container. In this regard, one embodiment of such a method, among others, can be broadly summarized by the following steps: forming a base, using longitudinal metallic wire, in a generally planar configuration; attaching a hinge mount to the base; attaching a first hinge to the hinge mount; and pivotally securing a first vertical support to the first hinge.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 6A-6C are front-elevational views of vertical supports for alternative embodiments of a device disclosed herein.

FIG. 7 is a front-elevational view of an embodiment in a folded position for convenient storage.

DETAILED DESCRIPTION

Figure 1:
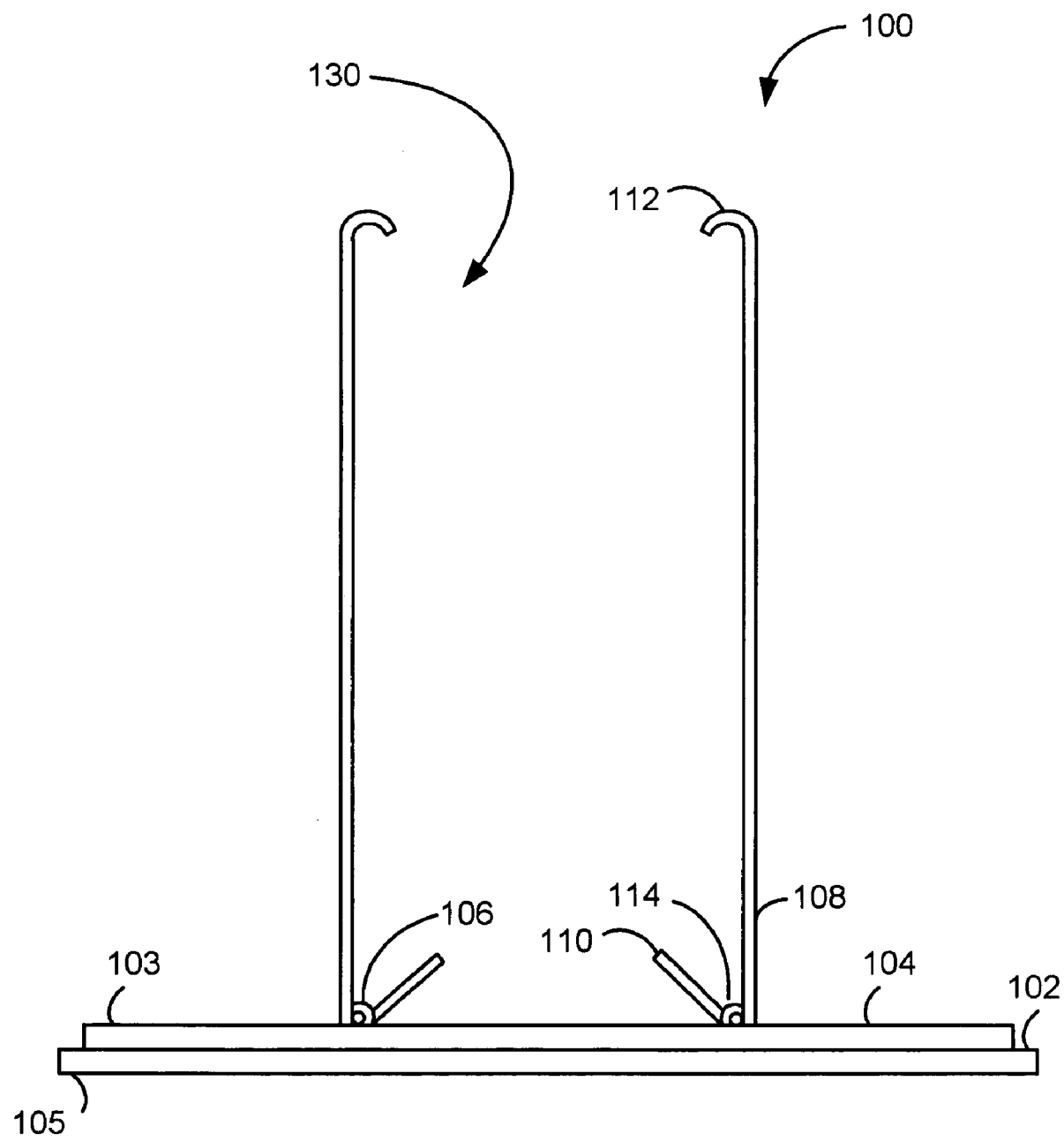
FIG. 1 is a front-elevational view of an embodiment of a device disclosed herein.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications, and equivalents included within the spirit and scope of the disclosure as defined by the appended claims.

Reference is made to FIG. 1, which is a front-elevational view of an embodiment of a device disclosed herein. The poultry roasting apparatus 100 includes a base 102 that is formed of a heat resistant material. The heat resistant material can include, for example, elongated metallic stock including, but not limited to, metallic rods or wire formed in a generally planar configuration. The planar configuration provides lateral stability when the apparatus is placed on a flat or substantially planar cooking surface, such as a grate, or cooking surface on a barbecue grill. At least one hinge mount 104 is attached to a first side 103 of the base 102. The hinge mount 104 is also formed of a heat resistant material including, but not limited to, elongated metallic stock such as metallic rod or wire. The apparatus 100 can include one or more hinge mounts 104 depending on the desired configuration. At least one hinge 106 is attached to the hinge mount 104. The hinge 106 is formed of a heat resistant material including, but not limited to, a metallic rod or wire and can be generally cylindrical to provide a smooth pivotal engagement with the vertical support 108. The pivotal engagement permits the vertical support 108 to rotate to a position against the base 102 to create a substantially flat profile for convenient storage. The vertical support 108 can also include a retaining member 112 for engaging the top surface of a metallic liquid-storage container (not shown here). The metallic liquid-storage container can be, for example, an aluminum can of the type used to store soft drinks or beer.

A container support 110 can also be attached at the hinge 106 and can be resiliently engaged (see 114) with the vertical to the support 108. The container support 110 serves to engage the bottom surface of the metallic liquid-storage container, such that the resilient engagement between the retaining member 112 and the container support 110 serves to mechanically capture the metallic liquid-storage container. The apparatus 100 can include, for example, more than one vertical support 108 to create a space 130 for receiving the metallic liquid-storage container.

Figure 2:
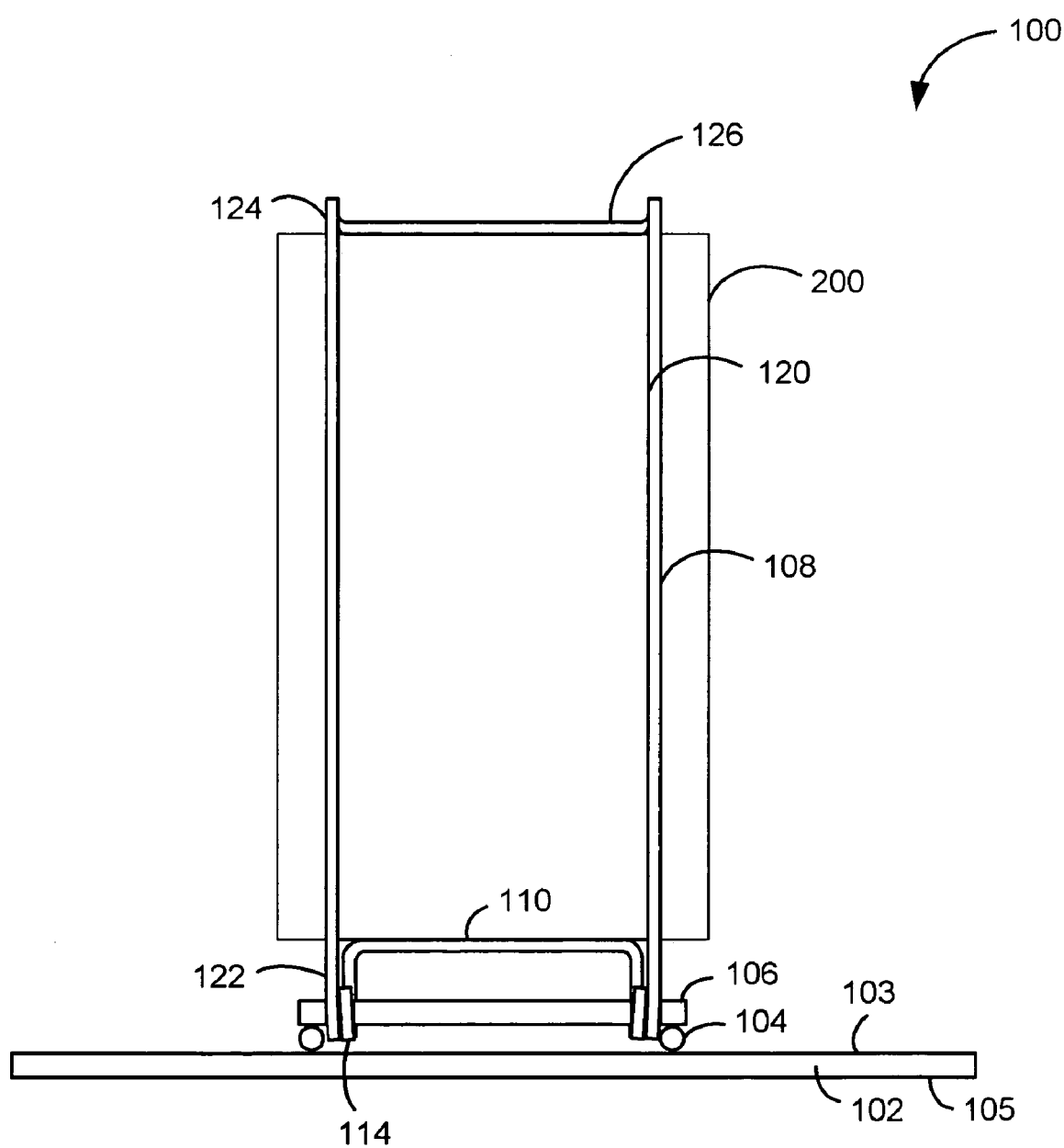
FIG. 2 is a side-elevational view of the embodiment depicted in FIG. 1.

Reference is now made to FIG. 2, which is a side-elevational view of the embodiment depicted in FIG. 1. As discussed above regarding FIG. 1, an embodiment of a poultry roasting apparatus 100 includes a base 102 having a first side 103 and a second side 105. One or more hinge mounts 104 are attached to the first side 103. The second side 105 is generally in contact with a cooking surface of an outdoor cooking device such as a barbecue grill. One or more hinges 106 are attached to the hinge mounts 104. At least one vertical support 108 is pivotally attached to a hinge 106. In some embodiments, the vertical support 108 includes a two longitudinal members 120, each having a proximal end 122, located at the pivotal engagement, and a distal end 124. The vertical support 108 may further include a base section 126 formed between the distal ends 124 of longitudinal members 120. The apparatus 100 can include a container support 110, which is pivotally attached to the hinge 106 and can include a resilient engagement 114 with the vertical support 108. As illustrated in FIG. 2, the vertical support 108 and the container support 110 can be formed of a single piece of elongated metallic stock where the resilient portion 114 is formed around the hinge 106.

Figure 3A:
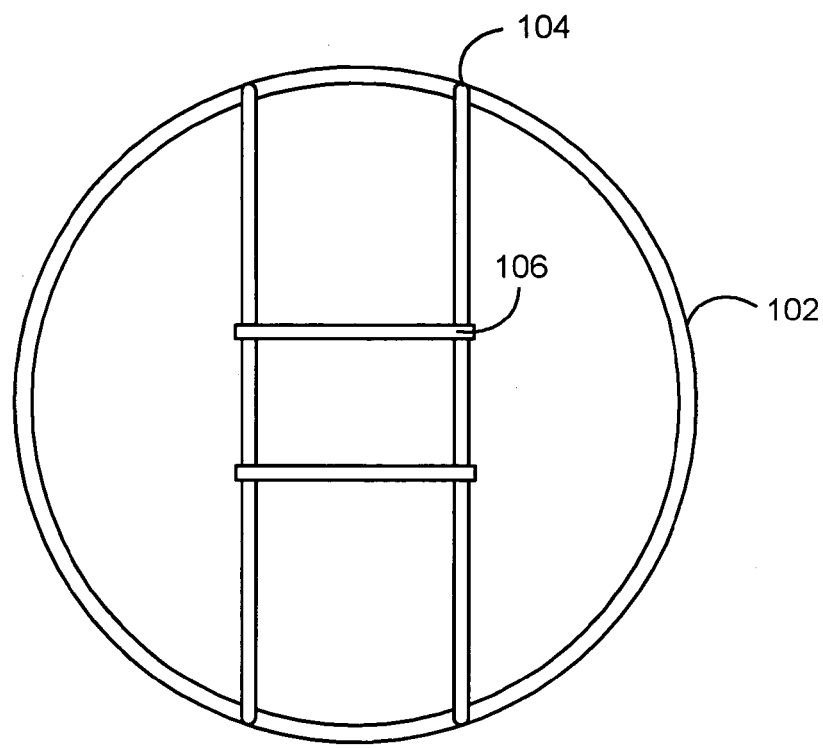
FIGS. 3A and 3B are partial top views of different embodiments of a device disclosed herein.
Figure 3B:
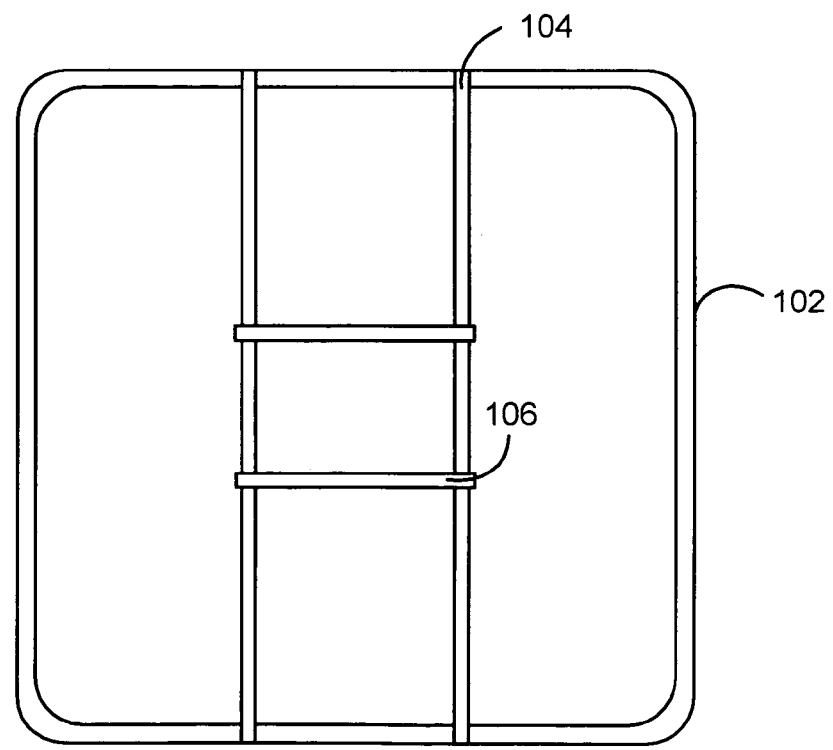

Reference is now made to FIGS. 3A and 3B, which are partial top views of alternative embodiments of an apparatus disclosed herein. Referring first to FIG. 3A, the base 102 is formed using a heat resistant material, such as a metallic rod or wire. Hinge mounts 104 are attached to the base in, for example, a generally parallel configuration. The means for attaching the hinge mounts 104 to the base 102 can include, for example, welding, brazing, bonding, or formed capture among others. Hinges 106 are attached to the hinge mounts 104 using means similar to those used to attach the hinge mounts 104 to the base 102. The shape and size of the base 102 can be varied to accommodate numerous factors including the type or size of poultry being roasted and the configuration of the cooking surface. For example, as shown in FIG. 3B, the base 102 may be generally square or rectangular versus the generally circular configuration illustrated in FIG. 3A. Alternatively, although not shown, the base can be constructed using, for example, bar stock, flat sheet, or expanded sheet metal, among others.

Figure 4:
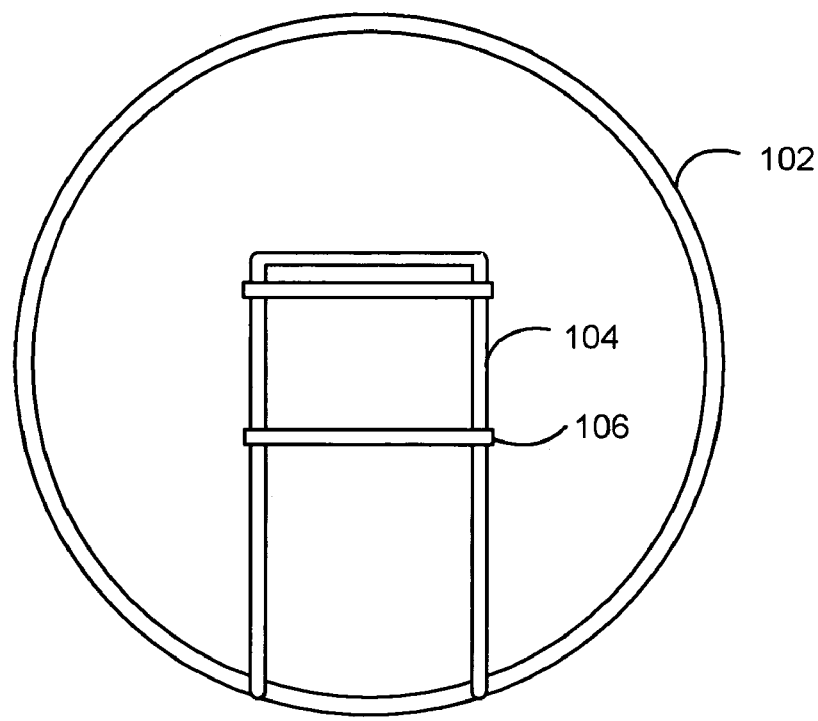
FIG. 4 is a partial top view of an alternative embodiment of a device disclosed herein.
Figure 5:
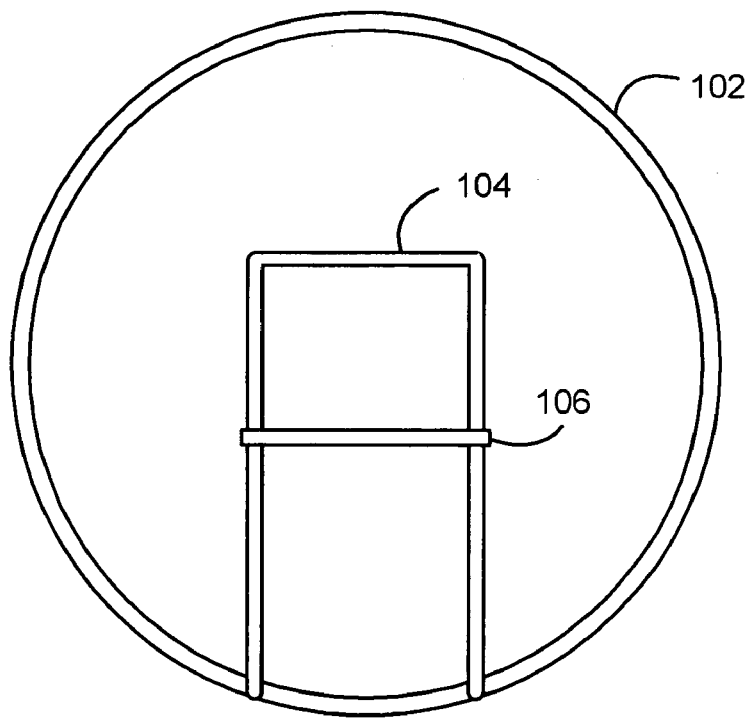
FIG. 5 is a partial top view of another alternative embodiment of a device disclosed herein.

Reference is now made to FIG. 4, which is a partial top view of an alternative embodiment of an apparatus disclosed herein. In an alternative embodiment, the apparatus may include a single hinge mount 104 capable of supporting one or more hinges 106. Similarly, referring to FIG. 5, the apparatus may feature a single hinge 106 for attaching a vertical support (not shown in this view). One of ordinary skill in the art knows or will know that the exemplary base 102, hinge mount 104, and hinge 106 configurations as illustrated are presented only by way example and not intended to limit the scope or spirit of this disclosure.

Reference is now made to FIGS. 6A-6C, which are front-elevational views of the vertical supports of alternative embodiments as disclosed herein. FIG. 6A illustrates an embodiment featuring two vertical supports 108 configured to create a space 130 for receiving a metallic liquid-storage container. The vertical supports 108 each include a retaining member 112 for engaging the top surface of the metallic liquid-storage container and an integrally formed container support 110 for engaging the bottom surface of the metallic liquid-storage container. The vertical supports 108 shown in FIG. 6B do not include retaining members 112 and, instead, show receiving sections 113, which serve to reduce the effort necessary to insert the metallic liquid-storage container into the apparatus. The configuration of 6B also creates a space 130 for receiving the metallic liquid-storage container. The configuration of FIG. 6C illustrates a single vertical support 108 having an integral container support 110 and a retaining member 112 for engaging the bottom and top surfaces, respectively, of the metallic liquid-storage container. In this configuration, only one hinge would be required for the device.

Reference is now made to FIG. 7, which is a front elevational view of an embodiment in a folded position. To accommodate a convenient storage configuration, the vertical supports 108 are pivoted on hinges 106 to a position where the vertical supports 108 contact or nearly contact the base 102. Although the vertical supports 108 are illustrated as folding in the same direction, one of ordinary skill in the art will appreciate that vertical supports 108 may both be pivoted in the other direction or may each be pivoted away from one another in opposite directions.

Figure 8:
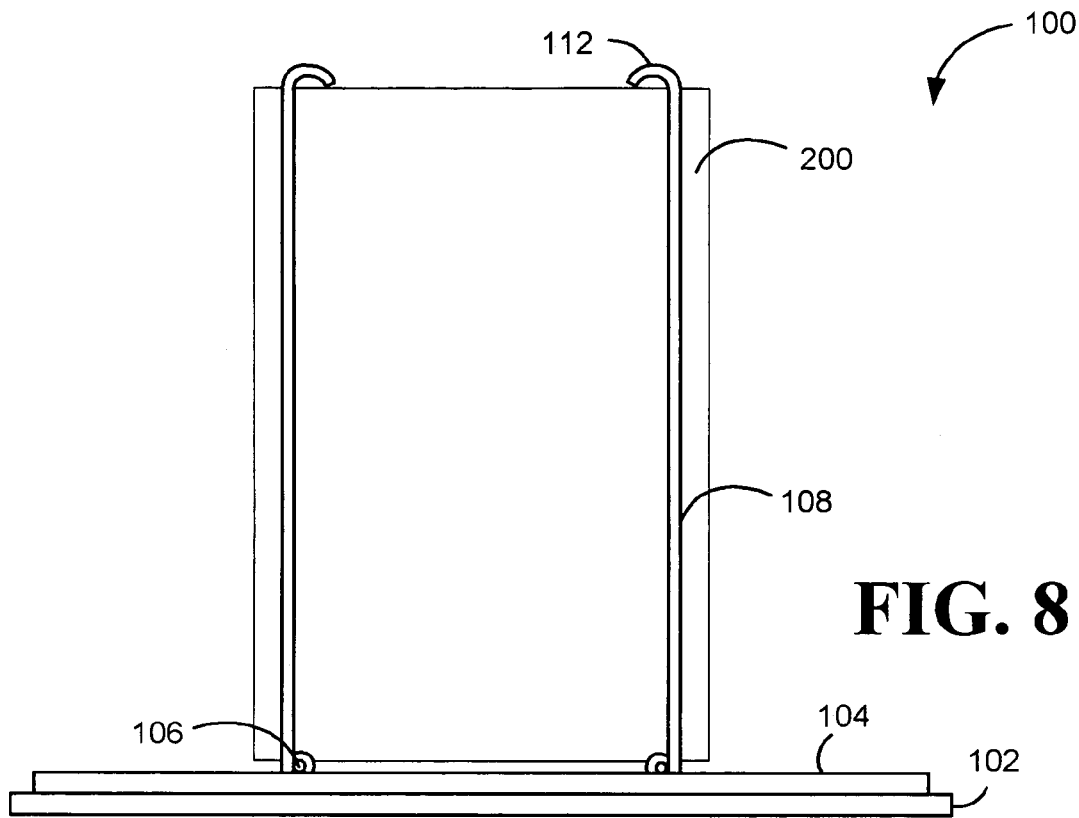
FIG. 8 is a front-elevational view of an alternative embodiment of a device disclosed herein.
Figure 9:
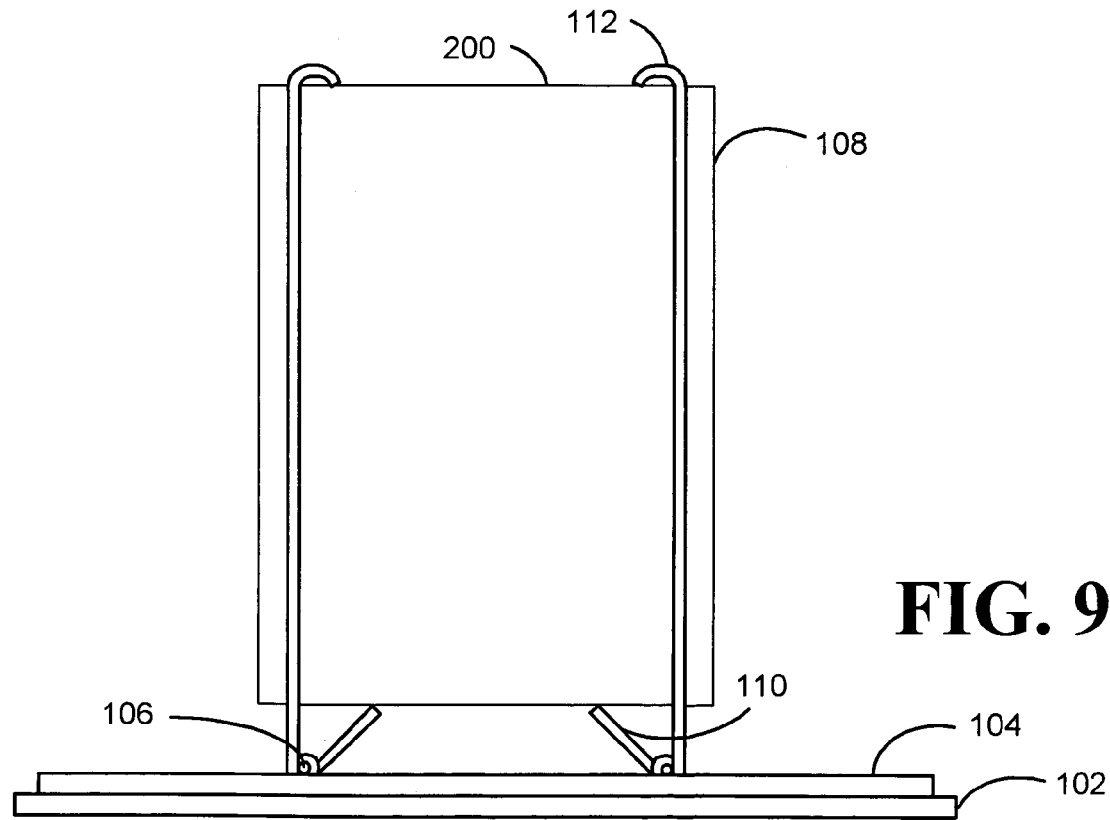
FIG. 9 is a front-elevational view of an embodiment with an exemplary metallic liquid-storage container.

Brief reference is made to FIG. 8, which is a front elevational view of an alternative embodiment of an apparatus disclosed herein. The apparatus 100 includes a base 102, one or more hinge mounts 104, and hinges 106. In an embodiment, a metallic liquid-storage container 200 may rest directly on the hinges 106 and be secured by the vertical supports 108 having retaining members 112. Alternatively, as shown in FIG. 9, which is a front elevational view of an embodiment with an exemplary metallic liquid-storage container 200 installed, the vertical supports 108 may be resiliently engaged with container supports 110 that are configured to engage the bottom of the metallic liquid-storage container 200.

Figure 10:
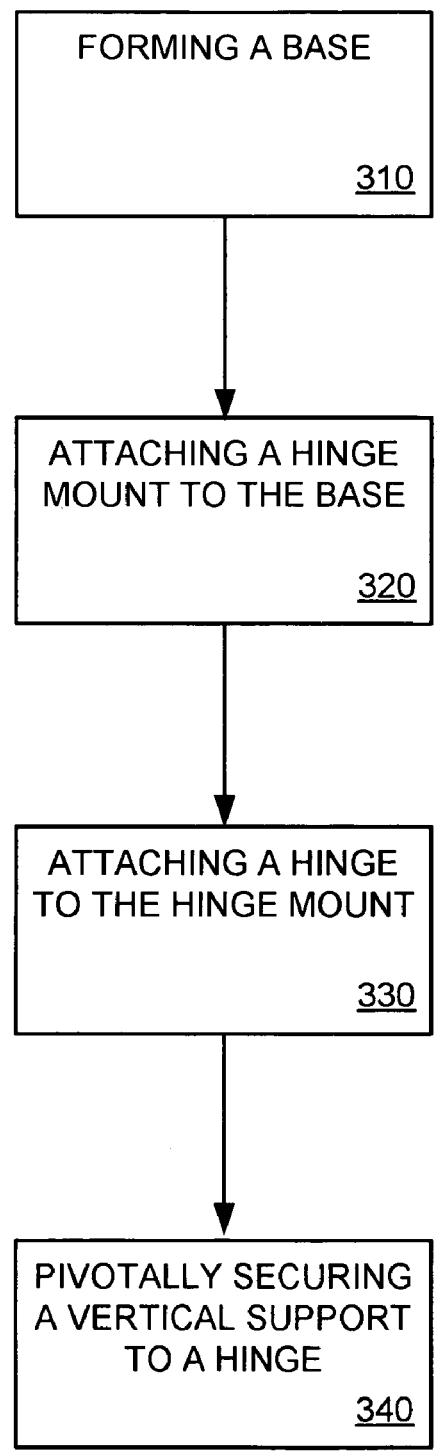
FIG. 10 is a block diagram illustrating steps for practicing the methods disclosed herein.

Reference is now made to FIG. 10, which is a block diagram illustrating steps for practicing the methods disclosed herein. In an embodiment, the method begins with forming a base in block 310. The base is formed in a generally planar configuration using for example elongated metallic wire or rod. Alternatively, the base could be formed of other relatively planar materials including metallic bar or expanded sheet metal, among others. A hinge mount is attached to the base in block 320. One or more hinge mounts may be utilized under the methods herein and may be formed using, for example, elongated metallic stock. Alternatively, a hinge mount may be formed of other heat resistant materials including ceramic or metallic plate or bar stock.

At least one hinge is attached to the hinge mount in block 330. The hinge may be formed of, for example, elongated metallic rod or wire. In block 340, a vertical support is pivotally secured to the hinge. The vertical support secures and/or retains a metallic liquid-storage container, such as an aluminum beverage container commonly used to store soft drinks or beer, and is configured to fold substantially flat against the base for convenience storage when the device is not in use.

In the use and operation of an embodiment, as illustrated in FIGS. 1 and 2, a user will place the poultry roasting apparatus 100 on the cooking surface of a barbecue grill such that the second side 105 of the base 102 is in contact with the grill cooking surface (not shown). The vertical supports 108 are positioned to create a space 130 for receiving a metallic liquid-storage container 200. The metallic liquid-storage container 200 is urged into contact with the container supports 110. The resilient engagement 114 between the container supports 110 and the vertical supports 108 compels the vertical supports 108 against the side wall of the metallic liquid-storage container 200. The user secures the metallic liquid-storage container 200 by positioning the retaining members 112 over the top of the metallic liquid-storage container. The metallic liquid-storage container 200 is opened and a whole cleaned bird, such as a chicken, is positioned over the apparatus such that the metallic liquid-storage container is inside the bird's body cavity. The heat source is then activated to initiate the cooking process. One of ordinary skill in the art will appreciate that the nature of the secure mounting of the metallic liquid-storage container 200 will facilitate attachment to the apparatus 100 before the apparatus is placed on the grill. For example, where the apparatus is utilized on a grill that requires a pre-cooking heating period, such as a charcoal fired grill, the apparatus 100 with the opened metallic liquid-storage container 200 attached can be placed on the hot grill and the bird can be placed over the apparatus. In addition to the roasting that occurs on the outside surfaces of the bird due to the heat source, the contents of the metallic liquid-storage container are heated to produce a steaming effect on the cavity surfaces of the bird.

It should be emphasized that the above-described embodiments of the present disclosure, particularly, any illustrated embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, having thus described the disclosure, at least the following is claimed:

1. A method for providing a folding device for roasting poultry using a metallic liquid-storage container, the method comprising:
    forming a base, using longitudinal metallic wire, in a generally planar configuration;
    attaching a hinge mount to the base;
    attaching a first hinge to the hinge mount;
    pivotally securing a first vertical support to the first hinge;
    attaching a second hinge to the hinge mount;
    pivotally securing a second vertical support to the second hinge; and
    pivoting said first and second vertical supports toward the base, said supports being parallel to one another, when the container has been removed after roasting the poultry.

2. The method of claim 1, wherein the first vertical support and the second vertical support are positioned to create a space for receiving the metallic liquid-storage container.

3. The method of claim 1, further comprising pivoting the first vertical support to a position against the base to create a substantially flat profile for storage.

4. The method of claim 1, further comprising forming a first retaining section in the first vertical support, wherein the first retaining section engages a top surface of the metallic liquid-storage container.

5. The method of claim 1, wherein the first vertical support comprises:
    extending a first member from the first hinge, wherein the first member is configured to provide lateral support of a metallic liquid-storage container;
    extending a second member from the first hinge, wherein the second member is configured to provide vertical support of the metallic liquid-storage container; and
    wherein an angle between the first member and the second member is in the range between thirty and ninety degrees.

6. The method of claim 5, wherein the first member is resiliently engaged with the second member at the first hinge.

7. The method of claim 5, wherein the first member and the second member are formed from a single length of elongated metal.

8. A folding apparatus for roasting poultry using a liquid storage container, comprising:
    a base, formed of a heat resistant material in a substantially planar configuration to provide lateral stability when placed on a cooking surface;
    first and second hinge mounts formed of a heat resistant material and attached to said base;
    first and second hinges formed of a heat resistant material and attached to said hinge mounts;
    first and second vertical supports formed of a heat resistant material, pivotally attached to said hinges;
    said vertical supports having a first position disposed substantially perpendicular to said base for receiving a liquid storage container; and
    said vertical supports having a second position disposed substantially parallel to one another and to said base for storage of the apparatus after use.

9. The apparatus of claim 8, in which said first vertical support and said second vertical support are positioned to create a space for receiving a liquid storage container.

10. The apparatus of claim 8, further comprising a first retaining section in said first vertical support, wherein said first retaining section engages a top surface of the liquid storage container.

11. The apparatus of claim 8 and including a first extension member extending from said first hinge, said first extension member configured to provide lateral support of the liquid storage container;
    a second extension member extending from said first hinge, wherein said second extension member is configured to provide vertical support of the liquid storage container; and
    said first extension member and said second extension member define an angle within the range of 32° to 90°.

12. The apparatus of claim 11 in which said first extension member is resiliently engaged with said second extension member at said first hinge.

* * * * *